United States Patent
Nasu et al.

(10) Patent No.: US 7,459,118 B2
(45) Date of Patent: Dec. 2, 2008

(54) HEATED MEDIUM SUPPLYING METHOD AND STRUCTURE FOR SECONDARY MOLDING OF RESIN MOLDED COMPONENT

(75) Inventors: Hidehisa Nasu, Oobu (JP); Akira Kuroyanagi, Chiryu (JP); Masato Ichikawa, Kariya (JP); Akira Sahashi, Nagoya (JP)

(73) Assignee: Denso Corporation, Kariya (JP)

( * ) Notice: Subject to any disclaimer, the term of this patent is extended or adjusted under 35 U.S.C. 154(b) by 775 days.

(21) Appl. No.: 11/086,218

(22) Filed: Mar. 22, 2005

(65) Prior Publication Data
US 2005/0212176 A1 Sep. 29, 2005

(30) Foreign Application Priority Data
Mar. 25, 2004 (JP) ............... 2004-089198

(51) Int. Cl.
*B29C 45/73* (2006.01)
(52) U.S. Cl. ............... 264/328.16; 264/328.14; 425/547
(58) Field of Classification Search ........... 264/161, 264/328.16, 406, 328.14; 425/547, 548
See application file for complete search history.

(56) References Cited

U.S. PATENT DOCUMENTS 4,746,384 A * 5/1988 Tan ............... 156/82
7,300,274 B2 * 11/2007 Nasu et al. ............... 425/547
2005/0212176 A1 * 9/2005 Nasu et al. ............... 264/328.16

FOREIGN PATENT DOCUMENTS

| AU | 302 447 | 10/1972 |
| DE | 38 51 567 | 4/1988 |
| DE | 102 59 031 | 7/2003 |
| GB | 676543 | 7/1952 |
| GB | 1128878 | 10/1968 |
| JP | 62-87315 | 4/1987 |
| JP | 4-91914 | 3/1992 |
| JP | 6-238707 | 8/1994 |
| JP | 9-104014 | 4/1997 |
| JP | 2003-245980 | 9/2003 |

OTHER PUBLICATIONS

Office Action dated Aug. 20, 2008 in German Application No. 10 2005 012 995.1 with English translation therof.

* cited by examiner

*Primary Examiner*—Jill L Heitbrink
(74) *Attorney, Agent, or Firm*—Harness, Dickey & Pierce, PLC

(57) ABSTRACT

A hot-air supply structure (1) comprises a hot air generator (20) and a housing (15) formed in the neighborhood of a hot-air inlet (81) of a molded component M in a die (10). A nozzle (21) is formed at the forward end of the hot-air generator, and an ejection port (211b) is formed on the side wall portion of the forward end needle unit (211) of the nozzle. The housing includes a support hole (151) in the nozzle, a relief hole (152), a flow path communication passage (153) and a bypass (154). The ejection port is movable between a first position to discharge the cool or warm air into the atmosphere through the bypass from the relief hole and a second position to introduce hot air into the flow path (8) of the molded component through the inlet (81) and the passage (153).

10 Claims, 6 Drawing Sheets

HEATED MEDIUM SUPPLYING METHOD AND STRUCTURE FOR SECONDARY MOLDING OF RESIN MOLDED COMPONENT

BACKGROUND OF THE INVENTION

1. Field of the Invention

The present invention relates to a method and a structure for supplying a heated medium into a resin material injection path before injecting a resin material at the time of secondary molding of a primary molded resin component in which the heated medium is supplied.

2. Description of the Related Art

In processing a hollow resin molded component, e.g. an intake manifold of an automotive vehicle, a primary molded component is secondary molded. In the process, a plurality of primary molded components, segmented by the primary molding, are set in a secondary molding die. These primary molded components are butted against each other and a resin material flow path is formed at the butt junction of the primary molded components. Then, a secondary molding resin material is injected into the flow path thus formed. In this way, an intake manifold can be integrally formed as a resin molded component.

In the case where the resin molded component is an intake manifold, the flow path is formed over a large distance in the primary molded component. If the secondary molding process is executed on the cooled and solidified primary molded component at room temperature, the secondary molding resin material injected is hardened so excessively that the problem is posed of a deteriorated deposition (joining after fusion) quality and a reduced deposition strength.

In the prior art, Japanese Unexamined Patent Publication No. 2003-245980 (Patent Document 1) discloses a method to solve the aforementioned problem and to improve the deposition strength by injecting a resin material after heating only the surface of the junction of the primary molded component to be coupled.

In this conventional method, the resin molded component is, for example, an intake manifold, and the junction of the primary molded components butted against each other in the secondary molding die is formed with a flow path to inject the secondary molding resin material around a pipe portion and a surge tank portion of the intake manifold. A first end of the intake manifold or, for example, one point of a part of the surge tank is formed with an inlet of a heated medium, and a second (the other) end or, for example, an end of one pipe portion is formed with a resin material inlet. Before injecting the resin material, the heated medium is supplied by way of the heated medium inlet. The heated medium is supplied over the entire periphery of the flow path and heats the surface of the junction. Once the heated medium comes to cover the whole peripheral surface of the flow path, the inflow of the heated medium is stopped, and the secondary molding resin material is injected into the heated flow path from the injection port.

As a result, the segmented primary molded components of a uniformly heated resin material can be coupled to each other, thereby preventing a reduction in deposition strength.

In the molding machine described Patent Document 1, however, if the heated medium supplied into the resin material flow path is a heated air, a hot air generator is arranged as a heated medium source. The hot air generator is often a commercially available air heater to supply a heated air to the forward end of a nozzle. The hot air blown from this air heater requires some length of time before reaching a steady temperature after the starting of the air heater. In the case where this variable hot air is supplied into the flow path of a molded component during this initial rising time, the temperature of the side wall in the path may be lower than a predetermined temperature in view of the fact that a steady heating temperature is not yet reached. This promotes the hardening of the resin material injected and reduces the deposition strength.

Therefore, it is desired to positively supply the heated medium, heated to a predetermined temperature, into the flow path of the molded component.

SUMMARY OF THE INVENTION

This invention is intended to solve the problem described above, and the object thereof is to provide a heated medium supply method and a supply structure thereof for the secondary molding of a resin molded component, wherein the heated medium that has reached a predetermined temperature can be positively supplied into the flow path of the molded component.

In order to achieve the object described above, according to a first aspect of the invention, there is provided a heated medium supply method for a resin molded component wherein a plurality of segmented primary molded components each have a join to couple the plurality of the primary molded components to each other, and the join is formed with a flow path to inject the secondary molding resin material therefrom. The plurality of the primary molded components thus segmented are set in a secondary molding die, and the heated medium and the secondary molding resin material can be selectively injected into the flow path of the secondary molding resin material.

In this heated medium supply method, an idling step is inserted before injecting the heated medium into the resin material flow path, so that the heated medium not at the predetermined temperature is discharged out of the die by supplying it through a bypass. Once the heated medium reaches the predetermined temperature subsequently, the bypass is closed and the heated medium is supplied into the flow path of the resin molded component. After confirming that the side wall of the flow path has reached the predetermined temperature by the heated medium thus supplied, the resin material is injected into the flow path from the injection port.

In this way, the heated medium that has reached the predetermined temperature can be positively supplied into the flow path to heat the side wall of the flow path to at least the predetermined temperature. Thus, the resin material can be hardened uniformly to thereby improve the deposition quality while at the same time preventing the deposition strength from decreasing.

According to a second aspect of the invention, there is provided a heated medium supply method in which the idling step is such that the nozzle ejection port for ejecting the heated medium is arranged at a first position to close the passage leading to the flow path and open the bypass. Therefore, the heated medium that has not reached the predetermined temperature in initial stages of heating is discharged out of the die through the bypass.

Next, the heated medium that has reached the predetermined temperature is located at a second position where the nozzle ejection port closes the bypass and opens the passage leading to the flow path. Therefore, the heated medium flows into and heats the flow path of the molded component. In the subsequent step to inject the resin material, the resin material is filled in the heated flow path and, thus, can be hardened uniformly. As a result, the deposition quality is improved while at the same time preventing the deposition strength from being reduced.

According to a third embodiment of the invention, there is provided a heated medium supply method, wherein the inlet of the heated medium is arranged on the overflow side of the resin material, i.e. the inlet of the heated medium and the injection port of the resin material are located on opposite sides. When injecting the resin material, therefore, the temperature in the neighborhood of the outlet of the heated medium can be measured by arranging a temperature sensor, for example, in the neighborhood of the heated medium outlet. The temperature in the neighborhood of the heated medium outlet is lowest in the entire flow path. Once the portion of the lowest temperature reaches a predetermined temperature, the injected resin material can be hardened uniformly and a superior molding process can be executed.

According to a fourth aspect of the invention, there is provided a heated medium supply device for the secondary molding of resin molded components, wherein a plurality of segmented primary molded components are coupled by joins to each other, and the coupled joins are formed with a flow path to inject the secondary molding resin material. The plurality of the segmented primary molded components are set in a secondary molding die, so that the heated medium or the secondary molding resin material can be selectively injected into the flow path of the secondary molding resin material.

The secondary molding die includes a housing having a first passage for discharging the heated medium out of the die through a bypass and a second passage communicating with the flow path of the molded component, and a heated medium generator for supplying the heated medium selectively to the two passages.

At the forward end of the heated medium generator, a nozzle is arranged to form an ejection port for blowing out the heated medium. The nozzle is adapted to slide in the guide hole formed in the housing so that the heated medium flows into selected one of the two passages.

In the initial stage of heating the heated medium, the heated medium has not yet reached a predetermined temperature. Therefore, the ejection port of the nozzle is moved to a position where the heated medium flows to the bypass, while once the heated medium reaches the predetermined temperature, the nozzle ejection port is moved to a position where the heated medium flows into the flow path of the molded component. After the heated medium flows over the whole periphery of the flow path, the resin is injected from the resin material inlet.

By the time the resin material is injected, therefore, the flow path of the molded component has reached the predetermined temperature. Therefore, the resin material can be hardened uniformly, thus improving the deposition quality while at the same time preventing the deposition strength from decreasing.

According to a fifth aspect of the invention, there is provided a heated medium supply device comprising a muffler arranged at the discharge port of the bypass, wherein in the case where the heated medium is a heated gas or air, the noise generated at the time of discharge can be muffled thereby to protect the environment.

According to a sixth aspect of the invention, there is provided a heated medium supply structure, wherein the housing includes a first passage for discharging the heated medium out of the die through the bypass, a second passage communicating with the flow path of the molded component, and a heated medium generator for selectively supplying the heated medium to the two passages.

An ejection port for blowing out the heated medium is formed in the nozzle arranged at the forward end of the heated medium generator. The nozzle is adapted to slide in the guide hole formed in the housing so that the heated medium flows into selected one of the two passages.

In the initial stage of heating the heated medium, the heated medium has not yet reached a predetermined temperature. Therefore, the nozzle ejection port is moved to a first position where the heated medium flows to the bypass making up the first passage thereby to discharge the heated medium out of the housing. Once the heated medium reaches the predetermined temperature, the nozzle ejection port is moved to a position where the heated medium flows into the main path in the molded component making up the second passage. Then, the heated medium flows over the entire periphery of the main passage and thus can heat the side wall of the main passage.

As a result, the main passage of the product can be advantageously maintained at a steady temperature over the whole periphery thereof for work conducted at high temperature such as the injection of the resin material for the secondary molding of a resin molded component.

According to a seventh aspect of the invention, there is provided a heated medium supply structure in which the ejection port of the heated medium of the nozzle is formed in the side wall of the nozzle, and therefore the axial forward end can be closed by the wall. Thus, the second passage can be sealed with the forward end wall portion of the nozzle when the nozzle ejection port is located at such a position that the heated medium is ejected toward the first passage (bypass). As a result, a seal structure can be easily configured.

According to an eighth aspect of the invention, there is provided a heated medium supply structure wherein, in the case where the heated medium is heated air, the hot air that has not yet reached a predetermined temperature is discharged into the atmosphere through the bypass making up the first passage.

DESCRIPTION OF THE PREFERRED EMBODIMENTS

A heated medium supply structure used for secondary molding of a resin molded component according to this invention will be explained with reference to the drawings. The explanation of the present structure assumes that the resin molded component is an intake manifold of an automotive vehicle, and the heated medium is a heated air (hereinafter referred to as the hot air). In the description that follows, therefore, the heated medium supply structure is called a hot air supply structure.

Figure 1:
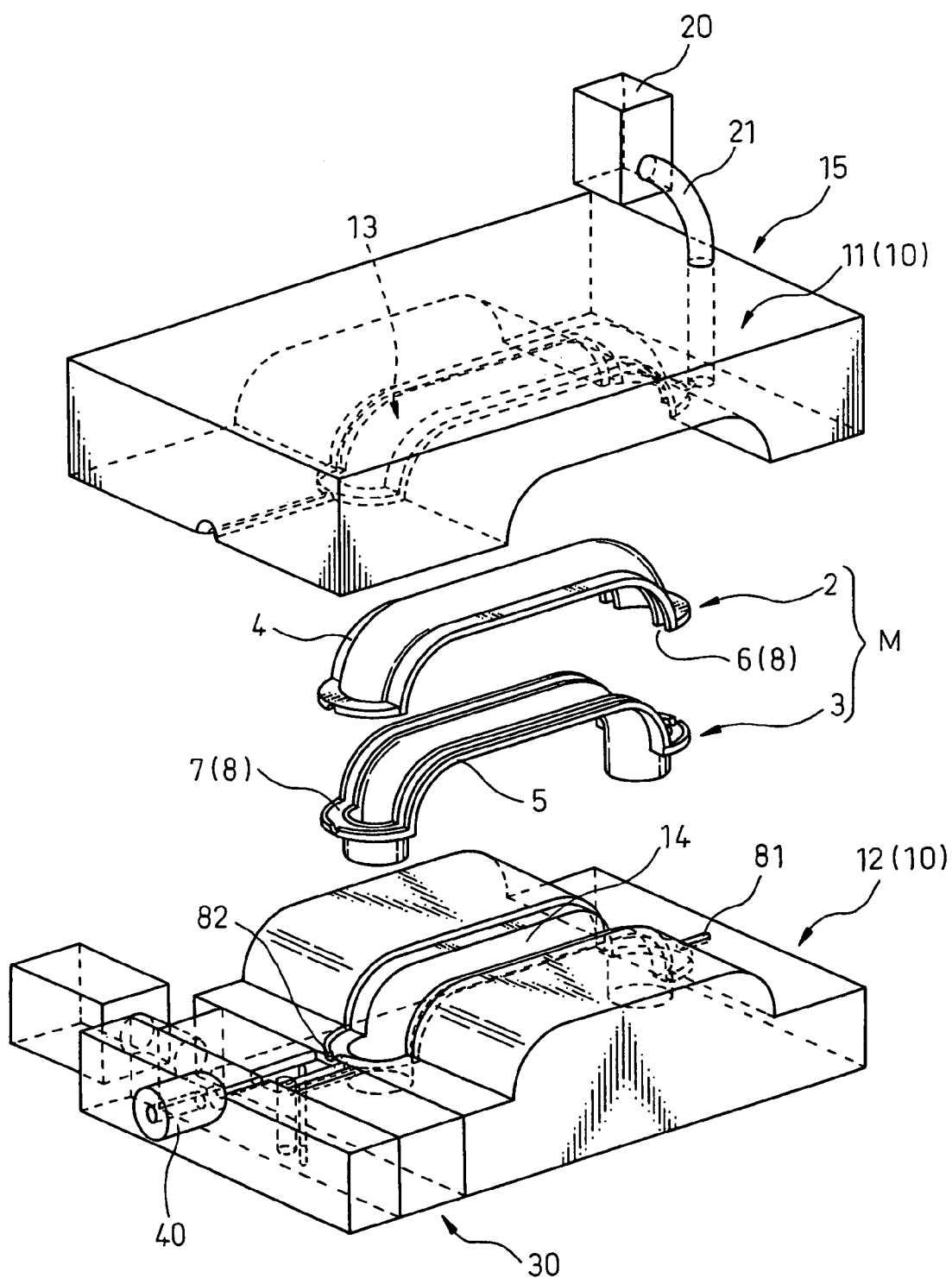
FIG. 1 is an exploded perspective view of a secondary molding die on which a primary molded component is mounted and subjected to the secondary molding process.

FIG. 1 shows the primary molded components 2, 3 of the intake manifold M set in an upper die 11 and a lower die 12 of a secondary molding die 10.

The primary molded components 2, 3 are formed with joins 4, 5, respectively, to couple the primary molded components 2, 3 to each other. Semicircular tubular paths 6, 7 are formed over the entire periphery of the coupling surface of the joins 4, 5. The tubular paths 6, 7 are each formed as a flow path (main path) 8 into which the secondary molding resin material (hereinafter referred to simply as a resin material) for coupling the primary molded components 2, 3 to each other is injected.

The upper die 11 has a depression 13 into which the primary molded component 2 is inserted, which depression 13 has the same shape as the primary molded component 2. The lower die 12 has a depression 14 into which the primary molded component 3 is inserted, which depression 14 has the same shape as the primary molded component 3.

A hot air inlet 81 communicating with the flow path 8 is formed at a first end of the depression 14 on the upper surface of the lower die 12 so that the hot air generator 20 is arranged to communicate with the hot air inlet 81. Also, a resin material injection port 82 communicating with the flow path 8 is formed at the second (the other) end of the depression 14 on the upper surface of the lower die 12.

A switching unit 30 communicating with the resin material injection port 82 is mounted at a first end surface of the lower die 12. The switching unit 30 has a switching valve to switch the hot air supplied from the hot air generator 20 and the resin material so that either of them are selectively injected into the flow path 8. In a part of the die 10 in the neighborhood of the hot air inlet, a hot air supply structure 1 including the hot air generator 20 is configured. The hot air generator 20 according to this embodiment heats the air by an electric heater using a nichrome wire.

Figure 2:
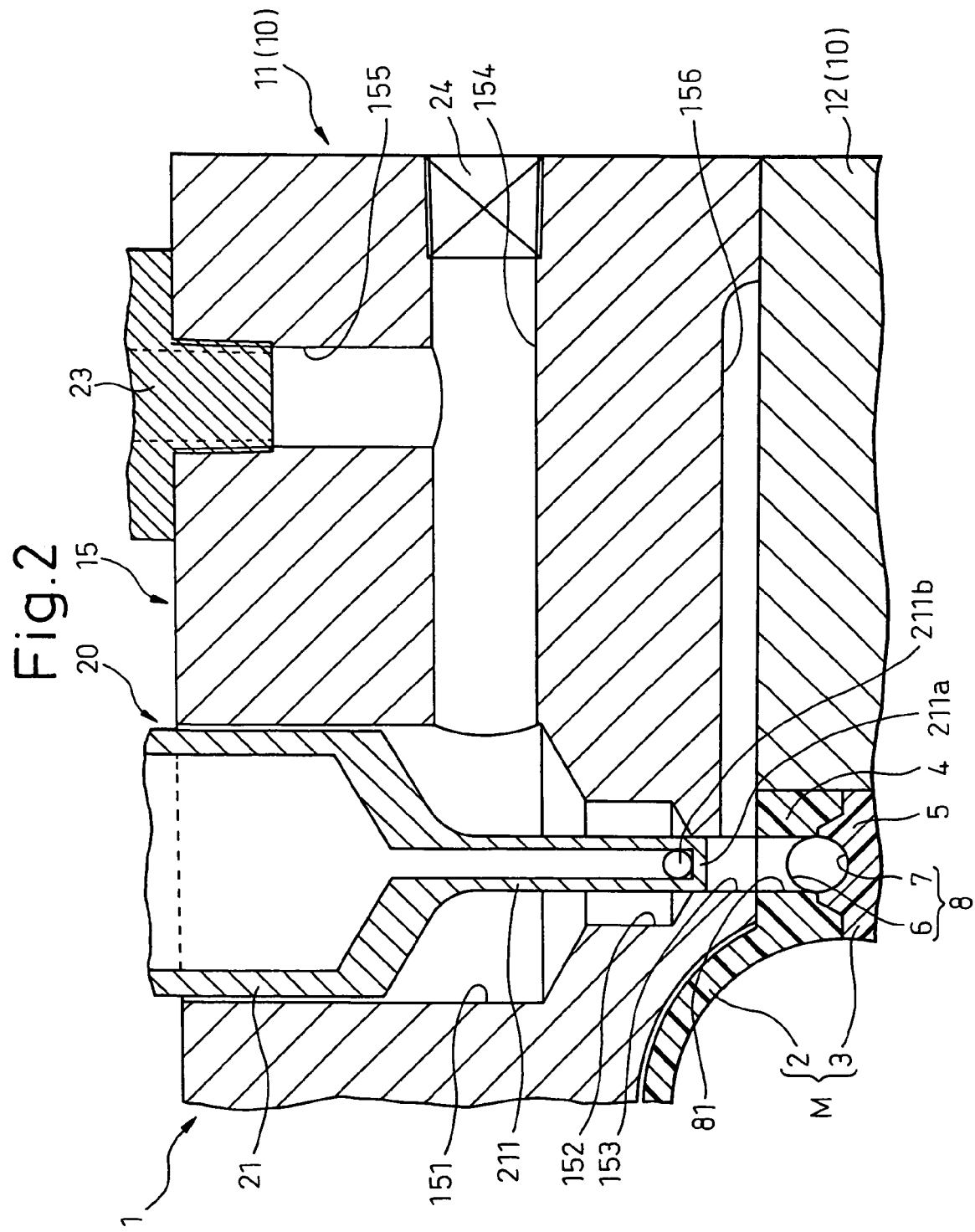
FIG. 2 is a sectional view showing a hot air supply structure according to an embodiment of the invention.

FIG. 2 is a sectional view of the hot air supply structure 1 including the hot air generator 20 having a cylindrical nozzle 21 at the forward end thereof and a housing 15 formed in the die. The nozzle 21 of the hot air generator 20 is inserted into, and is supported by, the housing 15.

The nozzle 21 of the hot air generator 20 is configured to be reciprocated by a cylinder not shown, and has a small-diameter needle unit 211 cylindrically formed at the forward end thereof. The needle unit 211 has a forward end wall portion 211a at the forward end thereof and an ejection port 211b for ejecting the hot air at a point of the side wall in the neighborhood of the forward end thereof is formed.

The housing 15 includes a support hole 151 formed in the neighborhood of the hot air inlet 81 of the flow path 8 of the resin molded component 3 in the secondary molding die 10 and adapted to be fitted with the nozzle 21 of the hot air generator 20; a relief hole 152 smaller in diameter than the support hole 151 and formed at the forward end of the support hole 151; a flow path communication passage (guide hole) 153 formed at the concentric forward end of the relief hole 152 to communicate with the hot air inlet 81 while at the same time guiding the needle unit 211 slidably; a bypass 154 formed in the direction perpendicular to the axis of the support hole 151 at the forward end thereof; and an atmosphere communication path 155 communicating with the bypass 154 so as to communicate with the atmospheric side.

The forward end of the support hole 151, the relief hole 152, the bypass 154 and an atmosphere communication path 155 make up a first passage to discharge the hot air to the atmosphere.

The flow path communication passage 153 and the hot air inlet 81 make up a second passage to introduce the hot air into the flow path 8 of the resin molded component. The ejection port 211b formed at the forward end of the needle unit 211 of the nozzle 21 is adapted to selectively move to one of the position of the relief hole 152 communicating with the first passage and the position at which the ejection port 211b is inserted into the hot air inlet 81 making up the second passage.

Incidentally, the flow path communication passage 153 is formed with a long groove in the direction perpendicular to the axis as an overflow groove 156 functioning at the time of injection of a resin material into the flow path 8 in the resin material injection step described later.

Also, a muffler 23 is mounted on the atmosphere communication path 155, and the bypass 154 has a stop plug 24.

According to this embodiment, the first and second passages other than the hot air inlet 81 are formed in the upper die 11.

Next, the operation of the hot air supply structure 1 is explained with reference to FIGS. 1, 3 to 5.

The hot air supply structure 1 supplies the hot air at a predetermined temperature into the flow path 8 of the molded component and thus heats the side wall of the flow path 8 before injection of a resin material. In the hot air generator, the air is not yet heated and the hot air has not yet reached a predetermined temperature in the initial period immediately after turning on the power supply. Under this condition, the air which may flow into the flow path 8 cannot heat the interior of the flow path 8. It is necessary, therefore, to discharge the air having not yet reached the predetermined temperature out into the atmosphere.

Figure 3:
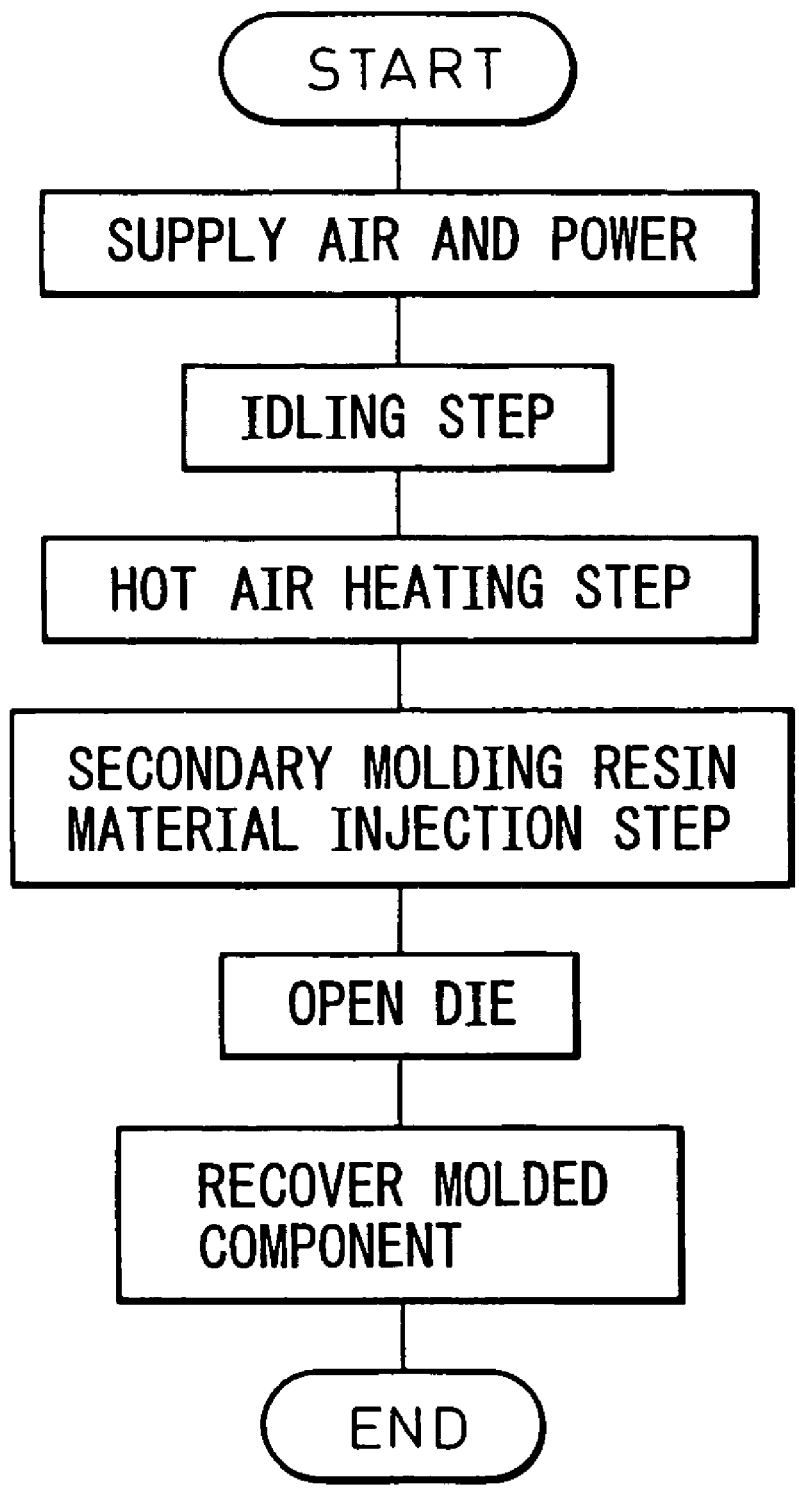
FIG. 3 is a flowchart showing the operation of the hot air supply structure shown in FIG. 2.

As shown in the flowchart of FIG. 3, therefore, the molding cycle starts after the primary molded components 2, 3 are set in the upper die 11 and the lower die 12 in the die 10. Immediately after starting the process, the air and power is supplied to the hot air generator 20, after which an idling step is performed in which the air having not yet reached the predetermined temperature is discharged out of the die. After that, when the air supplied from the hot air generator 20 reaches a predetermined temperature, the hot air is introduced into the flow path 8 of the molded component M (hot air heating step). Once the hot air covers the whole periphery of the flow path of the molded component M, the hot air is discharge into the atmosphere. At the same time, the resin material is injected into the heated flow path 8 (secondary molding resin material injection step), and after cooling, the die is opened and the molded component is recovered.

Figure 4:
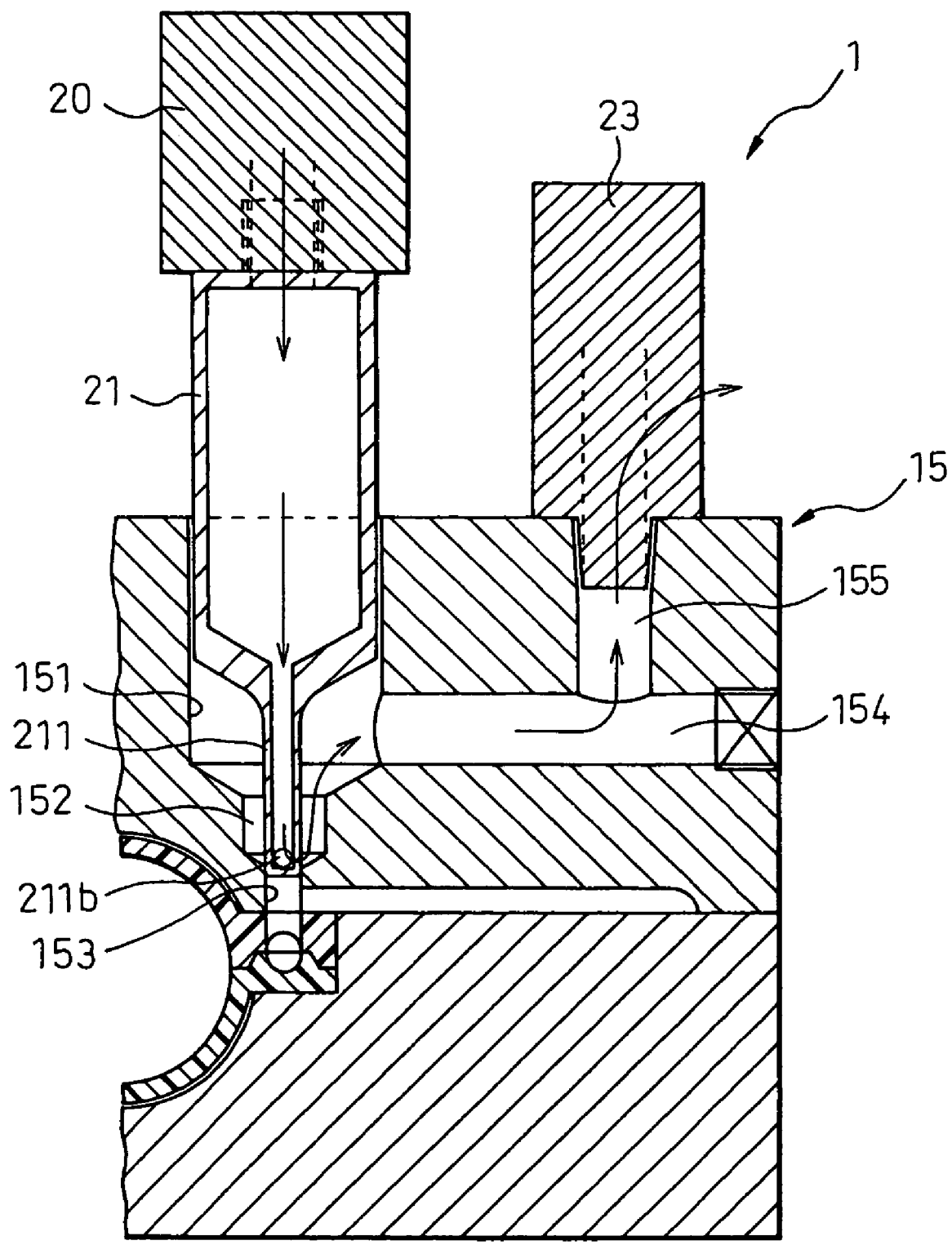
FIG. 4 is a sectional view showing the idling step of the hot air supply structure shown in FIG. 2.

Specifically, in the idling step, as shown in FIG. 4, the nozzle 21 of the hot air generator 20 is arranged at a position where the ejection port 211b formed on the forward needle portion 211 is located in the relief hole 152 of the housing 15. At this position, the forward end wall portion 211a of the needle portion 211 is inserted into the flow path communication passage 153, so that the forward end wall portion 211a of the needle unit 211 closes the flow path communication passage 153. Thus, the air ejected from the ejection port 211b formed on the side wall of the needle portion 211 is not supplied into the flow path communication passage 153 making up the second passage.

The air ejected from the ejection port 211b, which is being heated and has not yet reached the predetermined temperature, is called the cool air or the warm air.

The warm air ejected from the ejection port 211b, therefore, is supplied into the bypass 154 through the support hole 151 from the relief hole 152 making up the first passage. The cool air or the warm air that has flowed into the bypass 154 is discharged into the atmosphere through the muffler from the atmospheric communication path 155. As a result, the cool air or the warm air having not yet reached the predetermined temperature is discharged into the atmosphere without flowing into the flow path 8. In the process, the cool air or the warm air discharged into the atmosphere is reduced in noise by the muffler, thereby protecting the environment.

Once the hot air generator 20 enters the steady period from the initial stage immediately after the operation starts, the heated air reaches the predetermined temperature and becomes a hot air.

Figure 5:
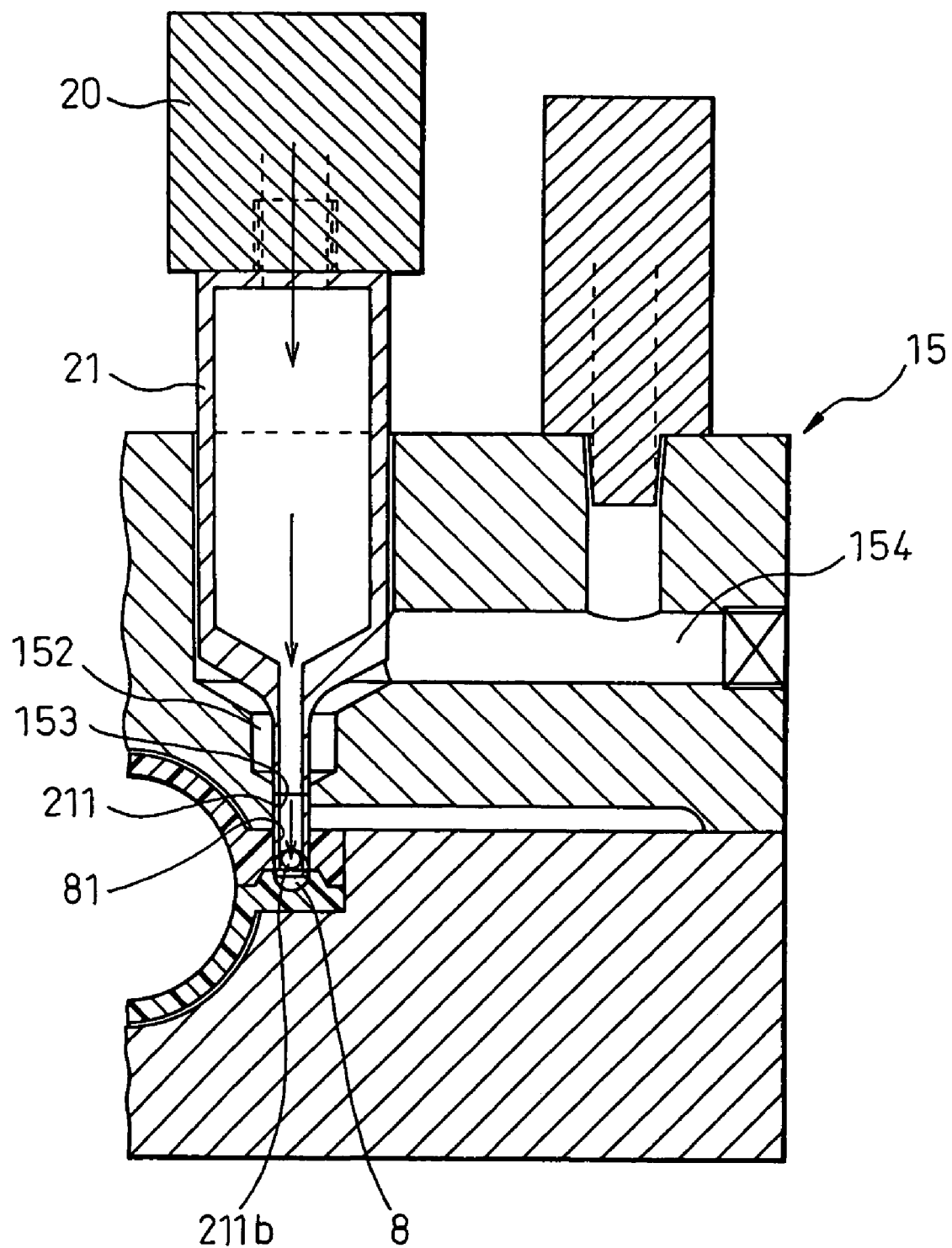
FIG. 5 is a sectional view showing the heating step of the hot air supply structure.

Then, as shown FIG. 5, the ejection port 211b formed in the needle portion 211 of the nozzle 21 is moved through the flow path communication passage 153 from the relief hole 152 and inserted into the hot air inlet 81. The hot air inlet 81 communicates with the flow path 8, and the ejection port 211b formed on the side wall portion of the needle unit 211 flows into the flow path 8 from the hot air inlet 81. In view of the fact that upper wall portion, other than the ejection port 211b of the needle unit 211, is closed by the flow path communication passage 153, the hot air blown out from the ejection port 211b flows in its entirety to the second passage without flowing through the first passage having the bypass 154.

The hot air flowing into the flow path 8, after flowing over the whole periphery of the molded component (intake manifold) M, enters the switching unit 30 from the resin material injection port 82 shown in FIG. 1 and is discharged into the atmosphere.

By arranging a temperature sensor in the neighborhood of the resin material injection port 82, the temperature of the hot air before being discharged into the atmosphere can be measured. As long as the measured temperature reaches a predetermined level (say, 100° C.), the entire periphery of the flow path 8 in the die 10 is not lower than the predetermined temperature. Under this condition, therefore, the switching unit 30 is operated and the resin material is injected from the ejection nozzle 40.

Figure 6:
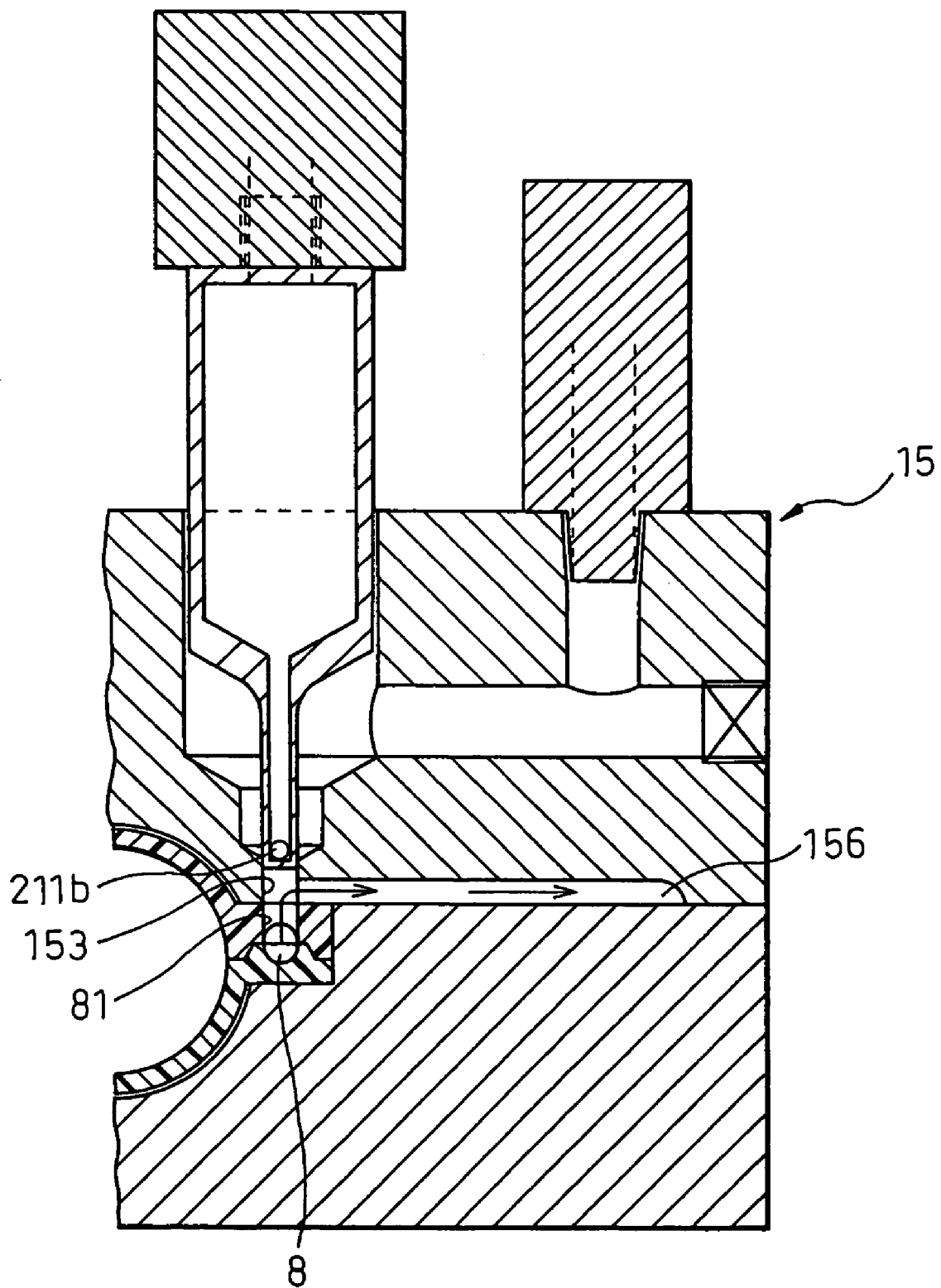
FIG. 6 is a sectional view showing the ejection step of the hot air supply structure.

In the case where the hot air is discharged into the atmosphere from the switching unit 30 and the resin material of, say, 280° C. is injected into the die 10 from the resin material injection port 82 through the switching unit 30, then the nozzle 21 of the hot air supply structure 1 moves upward so that the ejection port 211b reaches the position of the relief hole 152 from the hot air inlet 81. Then, the electric heater of the hot air generator 20 is turned off, while the flow of air continues to cool the electric heater. This operation is continued until the electric heater is cooled to a predetermined temperature. The resin material injected into the flow path 8 fills the entire periphery of the flow path 8. In view of the fact that the forward end wall portion 211a is formed at the forward end of the needle unit 211 as shown in FIG. 6, however, the resin material fails to flow to the first passage including the bypass 154 but flows to the overflow groove 156 through the flow path communication passage 153 from the hot air inlet 81.

When the resin material flows into the overflow groove 156, the injection of the resin material is stopped. After cooling, therefore, the die is opened and the secondary molded component (intake manifold) M is recovered from the secondary molding die 10. The steps described above can be automatically executed by managing a control unit not shown.

As described above, in the hot air supply structure 1 according to this embodiment, in the initial stage of operation of the hot air generator 20, the cool air or the warm air, not having reached a predetermined temperature, is discharged into the atmosphere from the bypass 154 in the idling step.

After that, the flow path 8 of the molded component 1 is heated over the entire periphery thereof and the resin material is injected.

The injected resin material is filled in the flow path 8 heated to the predetermined temperature. In this way, the resin material controlled in temperature is uniformly hardened, and a superior molding process can be conducted without generating a portion which has a different deposition strength.

Incidentally, the heated medium supply structure according to the invention is not limited to the embodiments described above. The heated medium supply structure, as long as it is so configured that the heated medium supplied from the heated medium generator, for example, can be selectively supplied through the first passage leading to the atmosphere or the second passage communicating with the main path, is applicable to other than the secondary molding process of the resin product.

Also, the heated medium is not limited to the heated air, but may be a fluid such as a heated gas, or water or oil.

What is claimed is:

1. A heated medium supply method for secondary molding of a resin molded component, wherein a plurality of segmented primary molded components are set in a secondary molding die and a heated medium is supplied to a flow path of a secondary molding resin material, which flow path forms a join for coupling a plurality of the plurality of segmented primary molded components, comprising:
   an idling step to discharge the heated medium out of the die from a bypass before being supplied to the flow path;
   a heated medium heating step to heat by supplying the heated medium to the flow path;
   a resin material injection step to inject the secondary molding resin material into the flow path.

2. The heated medium supply method for secondary molding of a resin molded component according to claim 1,
   wherein an ejection port of a nozzle for ejecting the heated medium is adapted to move between a first position to close a passage leading to the flow path and open the bypass and a second position to close the bypass and open the passage leading to the flow path.

3. The heated medium supply method for secondary molding of a resin molded component according to claim 1,
   wherein an inlet of the flow path for the heated medium is arranged on an overflow side of a resin material inlet.

4. The heated medium supply method according to claim 1,
   wherein the idling step is executed until the heated medium reaches a predetermined temperature.

5. A heated medium supply device for secondary molding of a resin molded component,
   wherein a plurality of segmented primary molded components are set in a secondary molding die and a heated medium is supplied to a flow path of a secondary molding resin material, which flow path forms a join for coupling the plurality of segmented primary molded components;
   wherein the secondary molding die includes a housing formed with a path to convey the heated medium toward a flow path of the resin molded component and a bypass to discharge the heated medium out of the die,
   the device further including a heated medium generator to supply the heated medium to bypass the flow path and the of the housing, a nozzle arranged at a forward end of the heated medium generator and a guide hole formed in the housing to slidably guide the nozzle; and
   wherein an ejection port formed on the nozzle is adapted to move between a first position to close a passage leading to the flow path and open the bypass and a second position to close the bypass and open the passage leading to the flow path.

6. The heated medium supply device for secondary molding of a resin molded component according to claim 5, wherein a muffler is arranged at a discharge port of the bypass.

7. The heated medium supply device according to claim 5, wherein an idling step in which the heated medium is discharged out of the die from the bypass before supplying the heated medium to the flow path of the secondary molding resin material is executed until the heated medium reaches a predetermined temperature.

8. A heated medium supply structure comprising: a housing; and a heated medium generator with a forward end thereof arranged slidably in the housing;
wherein the housing includes a first path to discharge a heated medium out of the housing through a bypass and a second path to convey the heated medium toward a main path;
wherein the heated medium generator includes a nozzle arranged at a forward end of the heated medium supply structure to supply the heated medium to each path of the housing; and
wherein an ejection port of the nozzle is adapted to move along a guide hole formed in the housing between a first position to close a passage leading to the main path and open the bypass and a second position to close the bypass and open the passage leading to the main path.

9. The heated medium supply structure according to claim 8,
wherein the ejection port of the nozzle is formed on a side nearer to a side wall of the nozzle with respect to an axis of the nozzle.

10. The heated medium supply structure according to claim 8,
wherein the heated medium is heated air.

* * * * *